United States Patent [19]

Chang et al.

[11] Patent Number: 5,472,649
[45] Date of Patent: Dec. 5, 1995

[54] METHOD FOR PREPARING POWDER COATING COMPOSITIONS HAVING IMPROVED PARTICLE PROPERTIES

[75] Inventors: Yeong-Ho Chang; Joseph C. Jernigan; Lanney C. Treece, all of Kingsport, Tenn.

[73] Assignee: Eastman Chemical Company, Kingsport, Tenn.

[21] Appl. No.: 227,224

[22] Filed: Apr. 13, 1994

[51] Int. Cl.⁶ .................................................. B29C 67/00
[52] U.S. Cl. ................................................................ 264/15
[58] Field of Search .................................................. 264/15

[56] References Cited

U.S. PATENT DOCUMENTS

| | | | |
|---|---|---|---|
| 3,674,736 | 7/1972 | Lerman et al. | 264/15 |
| 3,896,196 | 7/1975 | Dickey et al. | 264/15 |
| 4,154,871 | 5/1979 | White et al. | 427/195 |
| 4,243,794 | 1/1981 | White et al. | 528/112 |
| 4,833,060 | 5/1989 | Nair et al. | 430/137 |
| 4,863,646 | 9/1989 | Watanabe et al. | 264/15 |
| 5,244,944 | 9/1993 | Bott et al. | 523/461 |

FOREIGN PATENT DOCUMENTS

| | | |
|---|---|---|
| 52-107033A | 9/1977 | Japan . |
| 4248875A | 9/1992 | Japan . |

*Primary Examiner*—Mary Lynn Theisen
*Attorney, Agent, or Firm*—Bernard J. Graves, Jr.; Harry J. Gwinnell

[57] ABSTRACT

A method of preparing a powder coating composition comprises: (a) forming a mixture comprising solid particles which include a curable resin and a cross-linking agent that is reactive with the curable resin suspended in an aqueous liquid phase comprising water, a surfactant, a stabilizer, and a promoter; (b) warming the mixture to a temperature sufficient to effect reshaping and rounding of the particles; (c) separating the particles from the liquid phase; and (d) drying the particles to form a powder.

23 Claims, 8 Drawing Sheets

METHOD FOR PREPARING POWDER COATING COMPOSITIONS HAVING IMPROVED PARTICLE PROPERTIES

FIELD OF THE INVENTION

The invention relates to powder coating compositions, and more particularly to a method for preparing powder coating compositions having improved particle properties.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates, and do not soften when exposed to elevated temperatures. However, the curing of thermosetting coatings has created problems in obtaining coatings which have, in addition to the above stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems, which are inherently undesirable because of the environmental and safety problems that may be occasioned by the evaporation of the solvent system. Solvent based coating compositions also suffer from the disadvantage of relatively poor percent utilization; in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

In addition to exhibiting good gloss, impact strength, and resistance to solvents and chemicals, coatings derived from thermosetting coating compositions must possess good to excellent flexibility. For example, good flexibility is essential for powder coating compositions used to coat sheet steel that is destined to be formed or shaped into articles used in the manufacture of various household appliances and automobiles, in the course of which the sheet metal is flexed or bent at various angles.

Formation of a powder coating composition typically entails the dry mixing of flakes or granules of resin with the cross-linking agent and other ingredients, extruding the mixture at temperatures in the range of about 80° to 130° C., cooling the extrudate, and then chipping and grinding the resulting solid into particles of suitable size. This pulverizing operation typically produces a powder in which the particles are characterized by irregular shape and a broad size distribution.

PROBLEM TO BE SOLVED BY THE INVENTION

Methods of forming powder coating compositions that utilize standard pulverization processes produce dusty powders with broad particle size distribution and less than optimum flow properties are provided. The method of the present invention provides powder coating compositions that are characterized by narrowed particle size distribution and superior flow properties.

SUMMARY OF THE INVENTION

A method of preparing a powder coating composition comprises: (a) forming a mixture comprising solid particles which include a curable resin and a cross-linking agent that is reactive with the curable resin suspended in an aqueous liquid phase comprising water, a surfactant, a stabilizer, and a promoter; (b) warming the mixture to a temperature sufficient to effect reshaping and rounding of the particles; (c) separating the particles from the liquid phase; and (d) drying the particles to form a powder.

ADVANTAGEOUS EFFECTS OF THE INVENTION

The particles of a powder coating composition produced by the method of the present invention are characterized by rounded particles in a narrowed size distribution, which results in improved powder flow and coating smoothness.

DETAILED DESCRIPTION OF THE INVENTION

The method of the present invention provides a powder coating composition that comprises a curable resin and a cross-linking agent reactive with the curable resin and exhibits improved properties as a consequence of reshaping of the particles.

U.S. Pat. Nos. 4,154,871 and 4,243,794 disclose a powder for electrostatic application of protective coatings that is a mixture of rough granular and smooth spheroidized resin particles. This powder, in which 70–20% of the particles appear to be rough and 30–80% appear to be rounded, is formed by heating the dry pulverized resin at temperatures 50°–150° C., preferably about 100° C., above its softening point.

Japanese Application JP 4248875A discloses a powder coating composition containing rounded particles formed by heating a solution of a thermoplastic resin having hydroxyl and/or amino groups and a blocked isocyanate compound in a solvent such as trichloroethylene, then cooling the solution, and separating the particles by removal of the solvent or by precipitation upon the addition of a poor solvent.

In accordance with the present invention, the curable resin is preferably chosen from resins used in the powder coating art which have epoxy, carboxy, hydroxy, amino, or anhydride functional groups that can react with cross-linking compounds to provide cured coatings.

Preferred epoxy functional resins generally have a molecular weight of about 300 to about 4000, and have approximately 0.05 to about 0.99 epoxy groups per 100 grams of resin, i.e., 100–2000 weight per epoxy (WPE). Such resins are widely known and include those that are commercially available under the Epon™ tradename of the Shell Chemical Company, the Araldite™ tradename of CIBA-Geigy, and D.E.R. resins of the Dow Chemical Company.

Curable resins which have carboxy functional groups include polyesters. Such polyesters preferably have a molecular weight of about 500 to about 5000 and an acid number of about 35–75. Commercially available examples of such resins include Alftalat™ AN 720,721, 722,744, 758 and Alftalat™ AN 9970 and 9983 resins available from Hoechst Celanese.

Curable resins which have free hydroxy groups also include the polyesters as well as acrylic polymers. Hydroxy-functional polyesters and acrylic polymers preferably have a hydroxyl number from about 30 to about 60 (mg KOH/g polymer).

The polyesters as described herein may be produced using well-known polycondensation procedures employing an excess of glycol (or acid) to obtain a polymer having the specified hydroxyl (or carboxyl) number. The glycol residues of the polyester component may be derived from a wide variety and number of aliphatic, alicyclic, and aralkyl glycols or diols containing from 2 to about 10 carbon atoms. Examples of such glycols include ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylenediol, and the like.

The dicarboxylic acid constituent of the polyesters may be derived from various aliphatic, alicyclic, aliphatic-alicyclic, and aromatic dicarboxylic acids containing about 4 to 10 carbon atoms or ester-forming derivatives thereof, such as dialkyl esters and/or anhydrides. Succinic, glutaric, adipic, azelaic, sebacic, fumaric, maleic, itaconic, 1,3- and 1,4-cyclohexanedicarboxylic, phthalic, isophthalic and terephthalic are representative of the dicarboxylic acids from which the diacid residues of the amorphous polyester may be derived. A minor amount, e.g. up to 10 mole percent, of the glycol and/or diacid residues may be replaced with branching agents, e.g., trifunctional residues derived from trimethylolethane, trimethylolpropane and trimellitic anhydride.

The preferred polyesters suitable for the practice of this invention have a glass transition temperature, $T_g$ greater than 55° C., and an inherent viscosity of about 0.15 to 0.4. The polyester resin preferably comprises (1) diacid residues of which at least 50 mole percent are terephthalic or isophthalic acid residues, (2) glycol residues of which at least 50 mole percent are derived from 2,2-dimethyl-1,3-propanediol (neopentyl glycol) and (3) up to 10 mole percent, based on the total moles of (2) and (3), of trimethylolpropane residues. These preferred hydroxyl functional polyesters are commercially available, e.g., under the names Rucote™ 107 and Cargill Resin 3000, and/or can be prepared according to the procedures described in U.S. Pat. Nos. 3,296,211; 3,842,021; 4,124,570; and 4,264,751, the disclosures of which are incorporated herein by reference, and Published Japanese Patent Applications (Kokai) 73-05,895 and 73-26,292. The most preferred polyester consists essentially of terephthalic acid residues, 2,2-dimethyl-1,3-propanediol residues and up to 10 mole percent, based on the total moles of 2,2-dimethyl-1,3-propanediol residues, of trimethylolpropane residues, and possesses a glass transition temperature, $T_g$, of about 50° to 65° C., a hydroxyl number of about 35 to 60, an acid number of less than 10, and an inherent viscosity of about 0.1 to 0.25 dL/g measured using 0.5 g of polymer per 100 mL of a 60/40 (w/w) blend of phenol/tetrachloroethane.

A curable acrylic resin suitable for the practice of this invention is preferably a polymer or resin prepared by polymerization of a hydroxy-substituted monomer such as hydroxyethyl methacrylate, hydroxyethyl acrylate, hydroxyhexyl acrylate, hydroxyhexyl methacrylate, hydroxypropyl acrylate, hydroxypropyl methacrylate, hydroxybutyl acrylate, hydroxylbutyl methacrylate, and the like, optionally polymerized with other monomers such as methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, styrene, vinyl acetate, and the like. The ratio of reagents and molecular weights of the resulting acrylic polymers are preferably chosen so as to give polymers with an average functionality (the number of OH groups per molecule) greater than or equal to 2. Commercially available curable hydroxy-functional acrylic polymers include Joncryl™ 800, Joncryl™ 500, and Neocryl™ LE 800.

Curable resins containing epoxy groups which are suitable for the practice of the present invention can also be resins comprised of residues of glycidyl methacrylate (GMA) and/or glycidyl acrylate. Such resins generally have a number average molecular weight of about 500 to about 5000 and a weight average molecular weight of about 1000 to about 10,000. In a preferred embodiment, the resin is a glycidyl methacrylate resin containing from about 5 to about 40 weight percent GMA residues, having a number average molecular weight of about 1000 to about 3000 and a weight average molecular weight of about 2000 to about 8000. Commercially available resins include those available from Mitsui Toatsu Chemicals, Inc., available under the tradename Almatex™ PD 6100, PD 6300, PD 7110, PD 7210, PD 7310, PD 7610, and PD 1700. Further examples of such resins include those described in U.S. Pat. Nos. 4,042,645; 4,091,024; 4,346,144; and 4,499,239, the disclosures of which are incorporated herein by reference.

The various cross-linking agents suitable for use in the present invention are well known in the art of powder coatings. For example, with carboxy functional resins, cross-linking compounds with epoxy groups can be utilized. Likewise, with an epoxy functional resin, an anhydride type cross-linking compound can be used. Further, with hydroxy-functional resins, blocked isocyanates can be used. Also, a carboxy functional resin may be blended with an epoxy resin, optionally in the presence of another epoxy functional compound such as triglycidyl isocyanurate, and cured.

Examples of anhydride type cross-liking compounds include trimellitic anhydride, benzophenone tetracarboxylic dianhydride, pyromellitic dianhydride, tetrahydrophthalic anhydride, and the like.

In general, carboxy-functional cross-linking agents are $C_3$–$C_{30}$ alkyl, alkenyl, or alkynyl compounds with two or more carboxylic acid functional groups. Preferred carboxy-functional cross-linking compounds can be described by the formula wherein n is an integer from 1–10. Examples of such carboxy-functional cross-linking agents include compounds such as dodecanedioic acid, azelaic acid, adipic acid, 1,6-hexanedioic acid, succinic acid, pimelic acid, sebacic acid, and the like. Other examples of carboxy-type cross-linking compounds include maleic acid, citric acid, itaconic acid, aconitic acid, and the like.

The blocked polyisocyanate compounds suitable for the practice of this invention are known compounds and may be obtained from commercial sources or prepared according to published procedures. Upon being heated to cure coatings of the compositions, the compounds become unblocked and the isocyanate groups react with hydroxy groups present in the polymer to cross-link the polymer chains and thus cure the compositions to form tough coatings. Examples of blocked polyisocyanate cross-linking agents include those which are based on isophorone diisocyanate blocked with ε-caprolactam, commercially available as Hüls 1530 and Cargill 2400, or toluene 2,4-diisocyanate blocked with ε-caprolactam, commercially available as Cargill 2450, and phenol-blocked polyisocyanate.

The most readily available blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962, the disclosures of which are incorporated herein by reference. However, the products marketed as ε-caprolactam blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional monomeric isophorone diisocyanate and the ε-caprolactam blocked, trifunctional trimer of isophorone diisocyanate. The description herein of the cross-linking agents as "polyisocyanates" refers to compounds which contain at least two isocyanate groups that are blocked with, i.e., reacted with, another compound, e.g., ε-caprolactam. The reaction of the isocyanato groups with the blocking compound is reversible at elevated temperatures, e.g., normally about 150° C., and above, at which temperature the isocyanato groups are available to react with the hydroxyl groups present in the polymer to form urethane linkages.

Alternatively, the blocked isocyanate may be a cross-linking effective amount of an adduct of the 1,3-diazetidine-2,4-dione dimer of isophorone diisocyanate and a diol having the structure wherein $R^1$ is a methylene-1,3,3-trimethyl-5-cyclohexyl diradical; $R^2$ is a divalent aliphatic, cycloaliphatic, aralkyl or aromatic residue of a diol; and X is a 1,3-diazetidine-2,4-dionediyl radical, wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent, and the adduct has a molecular weigh of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, the disclosures of which are incorporated herein by reference, by reacting the diazetidine dimer of isophorone diisocyanate, preferably free of isocyanurate trimers of isophorone diisocyanate, with diols in a ratio of reactants which gives an isocyanato:hydroxyl ratio of about 1:0.5 to 1:0.9, preferably 1:0.6 to 1:0.8. The adduct preferably has a molecular weight of 1450 to 2800 and a melting point of about 85° to 120° C.

The preferred diol reactant is 1,4-butanediol. Such an adduct is commercially available under the name Hüls BF1540.

The amount of the blocked diisocyanate crosslinking agent present in the compositions prepared by the method of this invention can be varied to control the properties of the resulting coatings. Typically, the amount of cross-linking agent which will effectively cross-link the curable resin to produce coatings having a desirable combination of properties is in the range of about 5 to 30 weight percent, preferably 15 to 25 weight percent, based on the total weight of cross-linking agent and resin. Optionally, a catalyst such as dibutyltin dilaurate may be used to facilitate cross-linking by the polyisocyanate compound. Based on the weight of cross-linking agent, 0.5 to 5 weight percent, preferably 1 to 2 weight percent, of the catalyst may be employed.

The powder coating compositions produced by the method of this invention may be prepared from the compositions described herein by dry-mixing the curable resin and the cross-linking agent along with other additives commonly used in powder coating compositions Typical of the additives which may be present in powder coating compositions are benzoin, flow aids or flow control agents, stabilizers, pigments, and dyes. The powder coating compositions prepared by the method of the invention preferably contain flow aids, also referred to as flow control or leveling agents, to enhance the surface appearance of cured coatings of the powder coating compositions. Such flow aids typically comprise acrylic polymers and are available from several suppliers, e.g., Modaflow™ from Monsanto Company and Acronal™ from BASF. Other flow control agents which may be used include Modarez™ MFP from Synthron, EX 486 from Troy Chemical, BYK 360P from BYK Mallinckrodt, Perenol™ F-30-P from Henkel, Resiflow™ P67 from Estron Chemical, and Additol™ XL486 from Hoechst. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present is preferably in the range of about 0.5 to 4.0 weight percent, based on the total weight of resin and cross-linking agent.

In accordance with the method of the present invention, a mixture that comprises particles containing a curable resin and a cross-linking agent, and optionally other additives as discussed above, is formed by dry-mixing followed by melt-blending. Melt-blending may be carried out using, for example, a Brabender extruder at a temperature of about 80° to 130° C.; the temperature should be kept sufficiently low to avoid premature reaction of the curable resin with the cross-linking agent.

After melt-blending, the extrudate is solidified by cooling and then pulverized by chipping and grinding to produce powder having a mean particle size in the range of about 10 μm to 300 μm. Grinding can be accomplished using any of several types of mills such as, for example, a hammer mill, an air classifying mill, or an air jet mill. Slurry coating compositions dispersed in water that are prepared by mixing resin pellets or granules with water and crushing the mixture with a ball mill, pot mill, or crusher are disclosed in JP 52107033A and JP 80004341B.

The resulting particles are suspended in an aqueous liquid phase comprising water, a surfactant, a stabilizer, and a promoter, and reshaped and rounded by warming the suspension to temperatures near the glass transition temperature, $T_g$, of the curable resin, from about 40° C. above to about 40° C. below the $T_g$, preferably from about 10° C. above to about 10° C. below the $T_g$. Warming of the suspension can be maintained from about 0.25 hour to 6 hours, preferably from about 0.50 hour to 2 hours.

The surfactant can be an ionic compound such as sodium dodecyl sulfate or, preferably, a nonionic compound such as a polyether alcohol. Suitable surfactants include Triton™ X-100 (from Union Carbide Co.), and Surfynol™ CT-136 and GA (from Air Products Corp.); they can be employed, singly or in combination, in amounts ranging from about 0.1 to 20 weight percent, preferably about 5 to 10 weight percent, of the aqueous liquid phase.

The stabilizer, or suspending agent, controls the reshaping of the particles while the suspension is being warmed and affects particle size distribution. The promoter facilitates the adherence of the stabilizer to the surface of the particles. Examples of suitable stabilizers include colloidal silica such as the commercially available Ludox™ SM, Ludox™ TM, and Nalcoag™ 1060. Other useful stabilizers are titanium dioxide or fumed aluminum oxide, which are available from Degussa Corp. Examples of suitable promoters are water soluble polymeric materials such as poly(diethanolamine adipate) and poly(methylaminoethanol adipate). Other useful promoters are described in U.S. Pat. No. 4,833,060, the disclosures of which are incorporated herein by reference.

Useful concentrations of solid particles range from about 1 to 50 weight percent, preferably from about 5 to 25 weight percent, of the aqueous liquid phase. Useful concentrations of stabilizer range from about 0.1 to 40 weight percent, preferably from about 0.5 to 5 weight percent, of the particulate solids. Similarly, useful concentrations of promoter range from about 0.05 to 40 weight percent, preferably from about 0.5 to 5 weight percent, of solids.

Following reshaping of the particles, they can be separated from the liquid phase by filtration and dried in air, in a vacuum oven, or in a fluidized bed. After drying, the particles preferably have a mean particle size from about 20 µm to 100 µm, more preferably from about 25 µm to 50 µm. Particle size distribution and mean particle size in compositions prepared according to the method of invention can be determined by means of a Microtrac particle size analyzer (available from Leeds & Northrup), using a technique that entails the measurement of the amount and angle of forward scattered light from a laser beam projected through a stream of particles.

Powder flow properties are determined with a Sames Model AS100 Fluidimeter, which conforms to French norm T 30 A doc 396 of the Association Francaise de Normalisation AFNOR. With this test, a powder coating material is fluidized using a controlled flow of air in a cylindrical test chamber having a porous bed support. The expanded bed height is first measured. The air flow is stopped and the bed height in repose is measured. A fractional bed expansion (B) figure is calculated from these two readings. The bed is again fluidized, an orifice near the bottom of the cylindrical chamber is opened, and powder is allowed to flow into a tared measuring container for a fixed time. Weighing the container and contents enables calculation of mass flow rate of the powder (M). Finally, a figure of merit, Sames "Aptitude to Spraying" (R) value, is calculated as the product of the fractional bed height expansion and the mass flow rate:

$R = B \times M$

The powder coating compositions may be deposited on various metallic and non-metallic, e.g., thermoplastic or thermoset composite, substrates by known techniques for powder deposition, such as by means of a powder gun, by electrostatic deposition, or by deposition from a fluidized bed. In fluidized bed sintering, a preheated article is immersed into a suspension of the powder coating in air. The particle size of the powder coating composition normally is in the range of 60 to 300 µm. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous uncratered coating. The temperature of the preheated article also effects cross-linking of the coating composition and results in the formation of a tough coating having a good combination of properties. Coatings having a thickness between 200 µm and 500 µm may be produced by this method.

The compositions also may be applied using an electrostatic process wherein a powder coating composition having a particle size of less than 100 µm, preferably about 25 µm to 50 µm, is blown by means of compressed air into an applicator in which it is charged with a voltage of 30 to 100 kV by high-voltage direct current. The charged particles then are sprayed onto the grounded article to be coated, to which the particles adhere because of the electrical charge thereon. The coated article is heated to melt and cure the powder particles. Coatings of 40 µm to 120 µm thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F (about 121° to 205° C.), or cold, is exposed briefly to the fluidized powder. The coated article then can be heated to effect cross-linking if the article was not preheated to a temperature sufficiently high to cure the coating upon contact of the coating particles within the article.

The powder coating compositions prepared according to the method of this invention may be used to coat articles of various shapes and sizes constructed of materials such as glass, ceramics and metals. The compositions are especially useful for producing coatings on articles constructed of metals and metal alloys, particularly steel articles. It is possible to cure some systems at temperatures as low as 115° C., for example, compositions containing epoxy resins, anhydride cross-linking agents, and quaternary ammonium salt or hydroxide cross-linking catalysts, as taught by U.S. Pat. No. 5,244,944, the disclosures of which are incorporated herein by reference. Compositions that are curable at relatively low temperatures, around 115° C. for example, are useful for coating articles formed of thermoplastic and thermosetting resin compositions.

Further examples of formulation methods, additives, and methods of powder coating application may be found in *User's Guide to Powder Coating.* 2nd Ed., Emery Miller, editor, Society of Manufacturing Engineers, Dearborn. (1987).

Powder coating compositions prepared by the method of the present invention are preferably applied to a coating substrate by means of electrostatic spraying, using apparatus such as a Ransburg corona type gun. Following spraying, the substrate is heated at temperatures in the range of about 115° to 200° C. for periods of about 5 minutes to 30 minutes. Cure of the coatings can be determined by standard test procedure ASTM 4752-87 and reported as MEK (Methyl Ethyl Ketone) solvent resistance. In this procedure, cotton cheese cloth folded according to specification is attached to the end of a 13-ounce ball peen hammer and saturated with MEK. The hammer is attached to a motorized controller that forces a back and forth sliding action of the cloth-covered hammer ball against the coating surface. A coating capable of withstanding 200 back and forth (double) rubs without marring of the coating surface is deemed cured.

The following examples further illustrate the invention.

Example 1

A mixture of the following components was combined in a Vitamix™ high-speed laboratory mixer and compounded in an APV twin-screw extruder (from APV Machinery Co.) at 130° C.:

| | |
|---|---|
| Rucote ™ 951 carboxy-substituted polyester resin | 379 g |
| Primid ™ XL552 β-hydroxyalkylamide cross-linking agent (Rohm & Haas) | 21 g |
| Modaflow ™ III flow control agent (Monsanto) | 4 g |
| Benzoin (DuPont) | 1 g |
| Tinuvin ™ 144 hindered amine light stabilizer (Ciba Geigy) | 6 g |
| Tinuvin ™ 234 UV absorber (Ciba Geigy) | 6 g |
| Titanium dioxide pigment (DuPont) | 200 g |

The extrudate was cooled, granulated, and pulverized in a Bantam mill (from Hosakawa Micron Systems) whose grinding chamber was cooled with liquid nitrogen. The resulting particles were classified through a 200 mesh screen to produce powder 1.

A 3000-mL 4-necked flask was charged with 2000 mL of H$_2$O, 8.67 g of poly(methylaminoethanol adipate), 6 mL of Ludox™ TM and 6.7 g of Triton™ X-100. 200 g of powder 1 was added to the solution, with stirring, and dispersed by stirring for 60 min (300 rpm, 30° C.). Following the dispersive stirring step, the mixture was heated to 65°±5° C. and held there for 1 hr. After cooling to room temperature, the solids were separated by filtration and allowed to air dry overnight. The air-dried powder was then transferred to a jacketed fluidizer and further dried by fluidizing at 45° C. with air for 2 hr to give powder 2.

Figure 1:
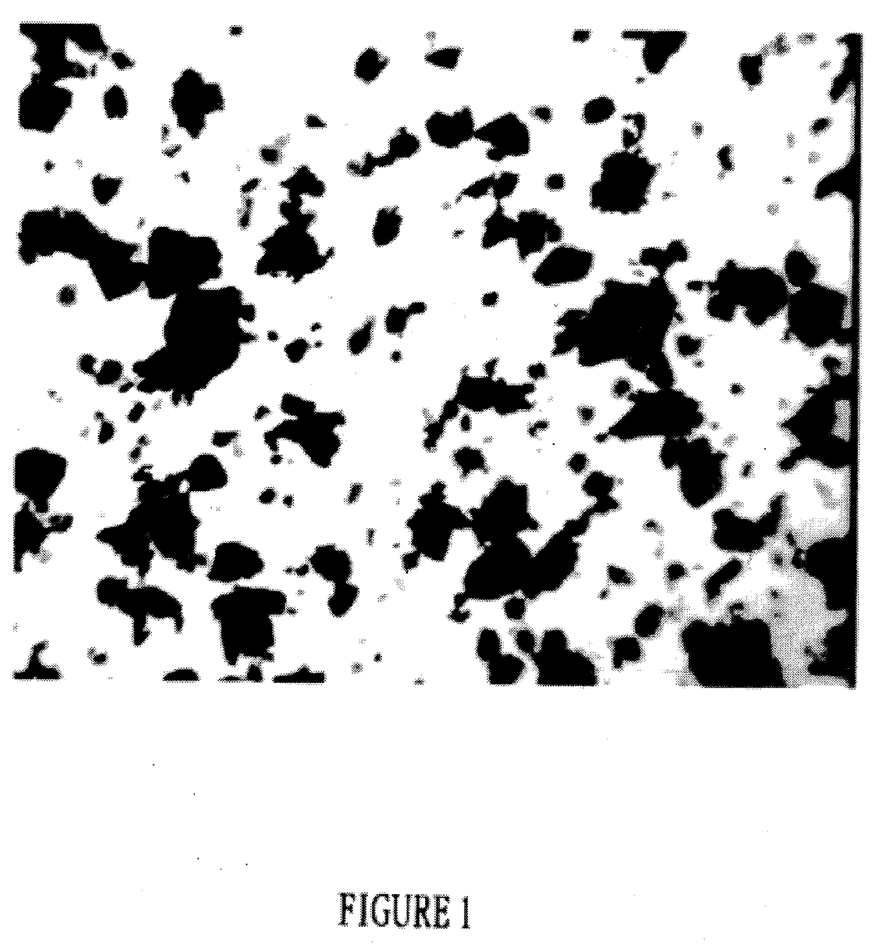
FIGS. 1–8 are photomicrographs at 170× magnification of particles of powder coating compositions before and after reshaping and rounding in accordance with the method of the invention.
Figure 2:
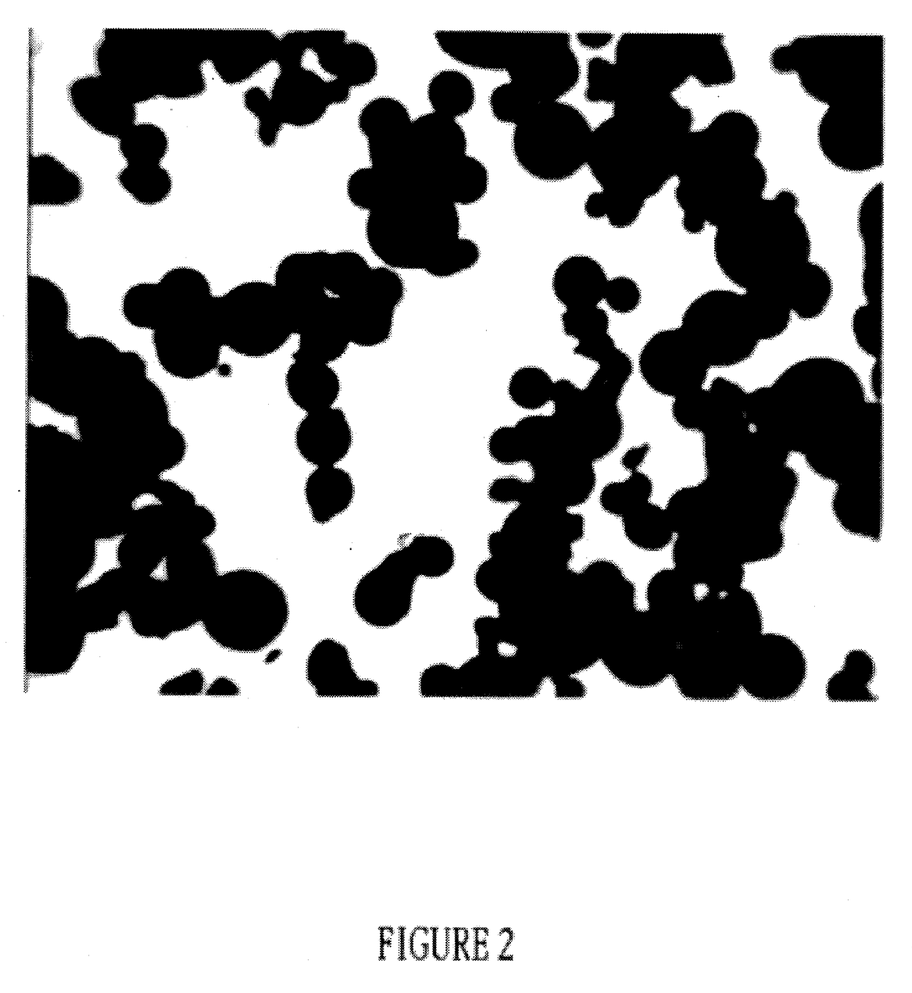

Comparison of the photomicrographs of powders 1 and 2 in FIG. 1 and 2, respectively shows the rounding of the particles and the narrowing of the size distribution that results from the method of the invention.

Example 2

A mixture of the following components was combined in a Henschel mixer and compounded in a ZSK 30 twin-screw extruder (from Werner Pfleiderer Corp.), at feed zone and die zone temperatures of 110° C., a screw rate of 250 rpm, and a feed rate sufficient to maintain 45% torque:

| | |
|---|---|
| Joncryl ™ 800B acrylic resin | 323 g |
| Rucote ™ 103 polyester resin | 19 g |
| Cargill 24-2400 blocked isocyanate cross-linking agent | 90 g |
| Almatex ™ PD 7610 acrylic resin (Mitsui Toatsu Chemicals) | 80 g |
| Dodecanedioic acid cross-linking agent | 16 g |
| Resiflow ™ P67 flow control agent (Estron Chemical) | 5.7 g |
| Zeosphere ™ 200 gloss control agent (Zeelan Co.) | 181 g |
| NYAD 1250 Wollastonite calcium metasterate gloss control agent (Nyco Co.) | 91 g |
| Titanium dioxide pigment Other pigments | 8.1 g |

The extrudate was cooled through a chill roll, granulated, and pulverized in a Bantam mill whose grinding chamber was cooled with liquid nitrogen. The resulting particles were classified through a 200 mesh screen to produce powder 3.

A 3000-mL 4-necked flask was charged with 2000 mL of H$_2$O, 8.7 g of poly(methylaminoethanol adipate), 6.0 ml of Ludox™ TM and 6.7 g of Triton™ X-100. 200 g of powder 3 was added to the solution, with stirring, and dispersed by stirring for 60 min (300 rpm, 30° C.). Following the dispersive stirring step, the mixture was heated to a temperature of 65°±5° C. and held for 1 hr. After cooling to room temperature, the solids were separated by filtration and allowed to air dry overnight. The air-dried powder was then transferred to a jacketed fluidizer and thoroughly dried by fluidizing at 45° C. with air for 2 hr to give powder 4.

Figure 3:
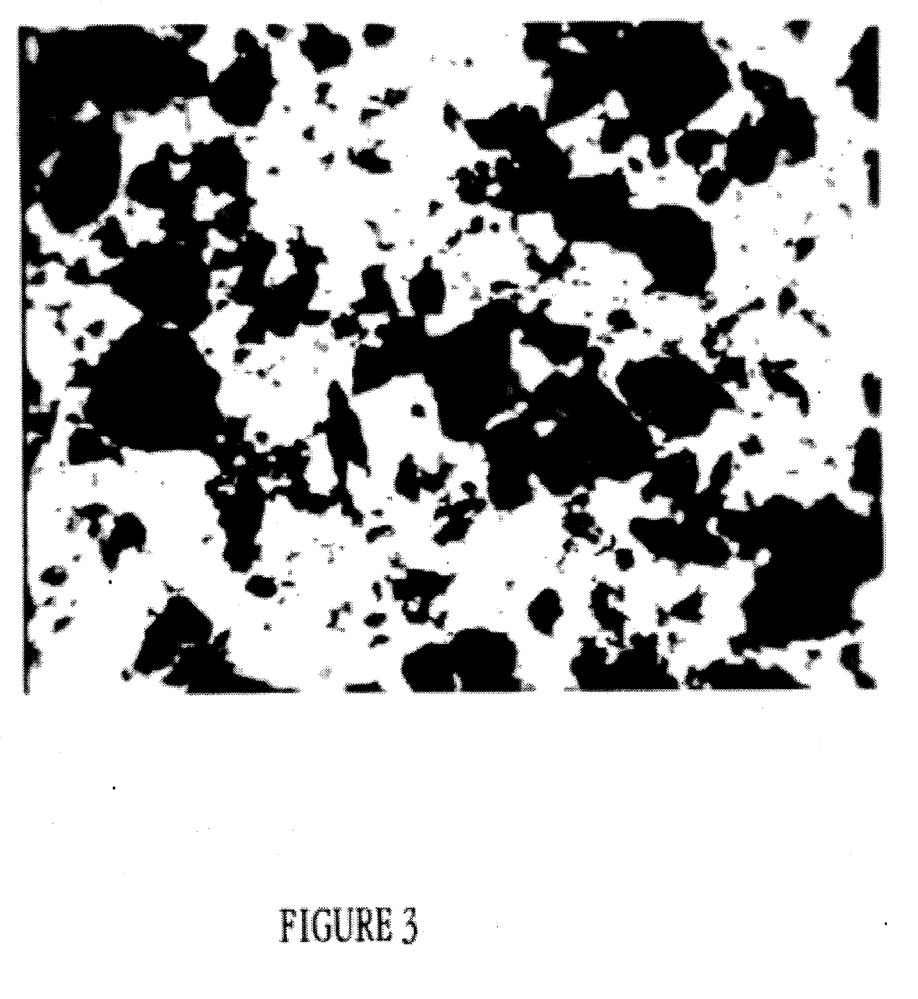
Figure 4:
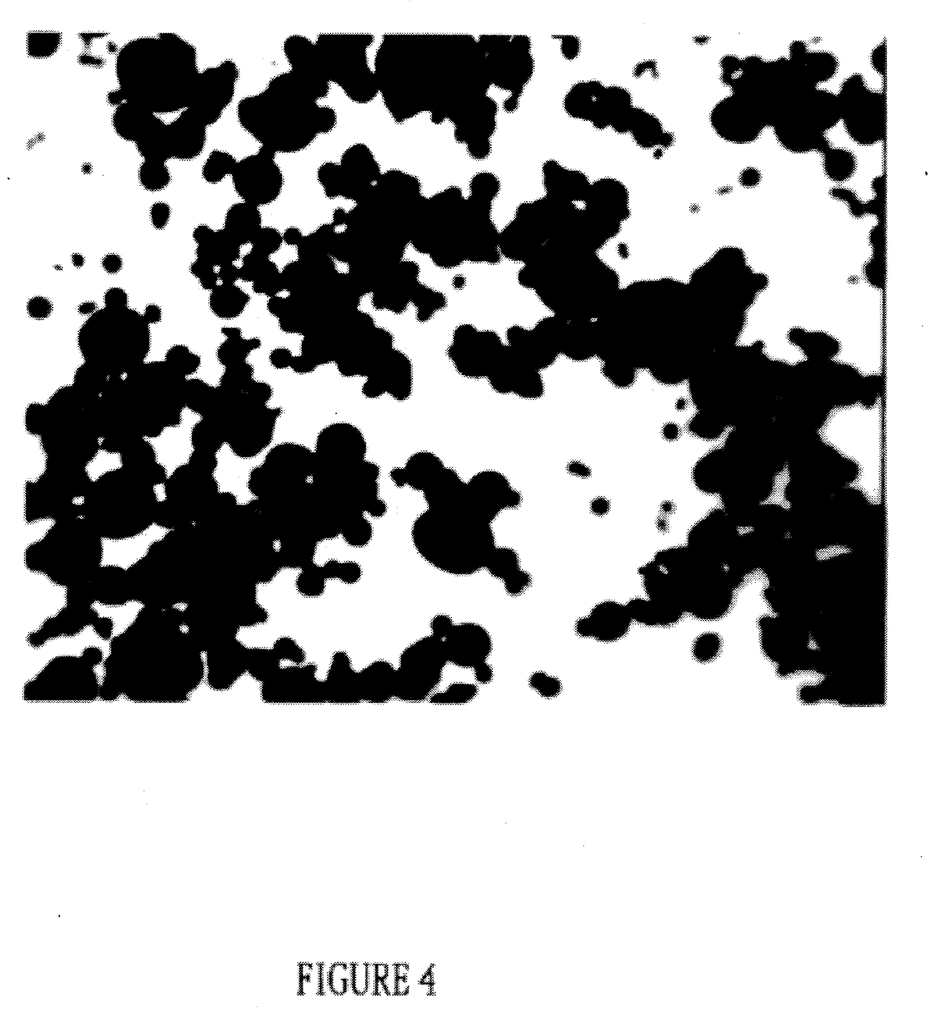

FIG. 3 and 4 contain the photomicrographs of powders 3 and 4, which illustrate the particle rounding and size distribution narrowing effected by the method of the invention.

Example 3

Powder 5 was produced, using the same procedure employed to make powder 3 in Example 2, from the following mixture:

| | |
|---|---|
| Alftalat ™ AN 744 carboxy-substituted polyester resin | 291 g |
| Epon ™ 2002 epoxy cross-linking agent | 291 g |
| Actiron ™ NX-3 curing accelerator (Synthron) | 6 g |
| Benzoin | 6 g |
| Additol ™ XL496 flow control agent (Hoechst) | 39 g |
| Titanium dioxide pigment | 348 g |
| Zinc stearate | 1.2 g |

A 3000-mL 4-necked flask was charged with 2000 mL of H$_2$O, 8.7 g of poly(methylaminoethanol adipate), 6.0 ml of Ludox™ TM and 6.7 g of Triton™ X-100. 200 g of powder 5 was added to the solution, with stirring, and dispersed by stirring for 60 min (300 rpm, 30° C.). Following the dispersive stirring step, the mixture was heated to a temperature of 65°±5° C. and held for 1 hr. After cooling to room temperature, the solids were separated by filtration and allowed to air dry overnight. The air-dried powder was then transferred to a jacketed fluidizer and thoroughly dried by fluidizing at 45° C. with air for 2 hr to give powder 6.

Figure 5:
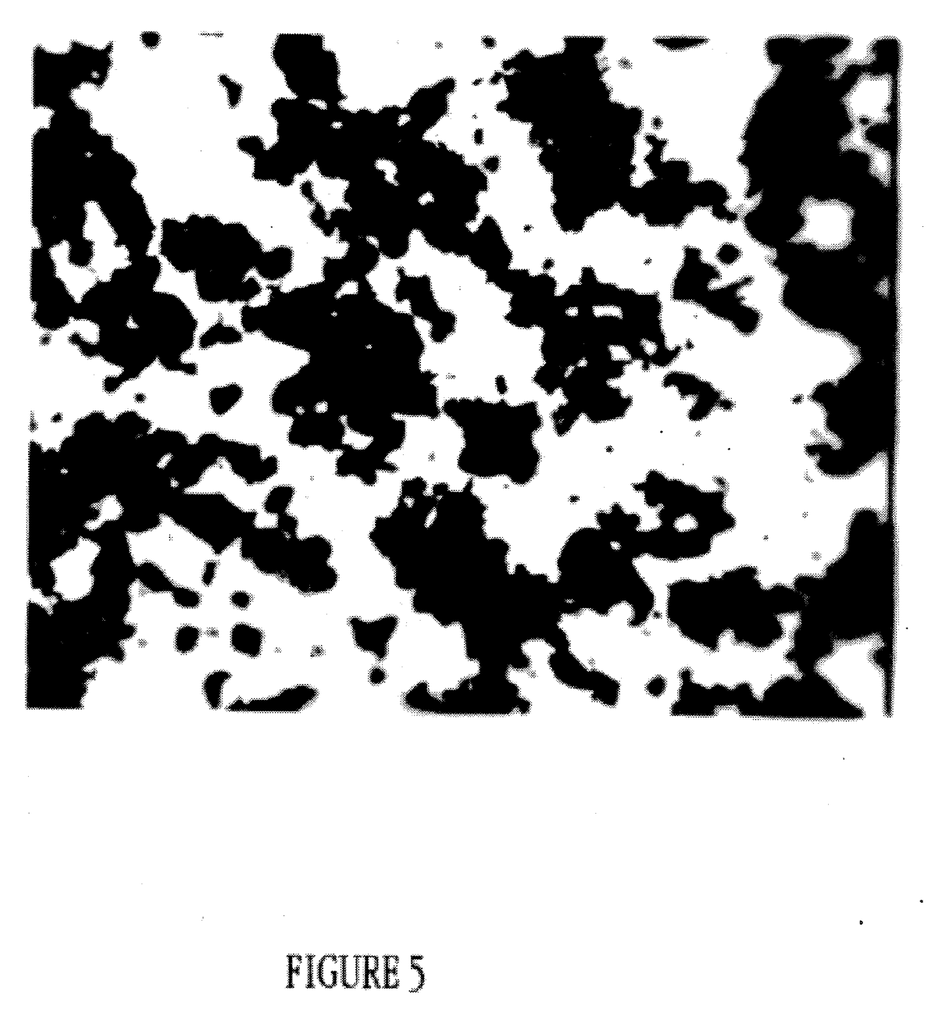
Figure 6:
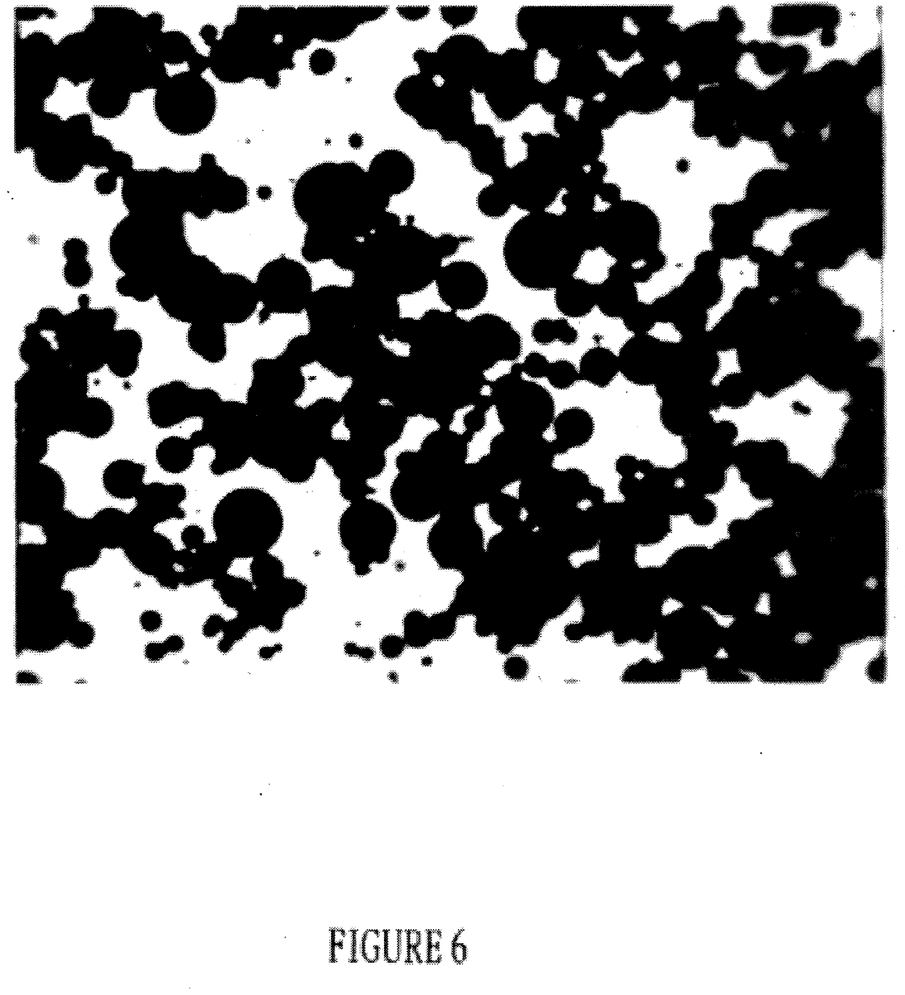

The photomicrographs of powders 5 and 6 in FIG. 5 and 6, respectively illustrate the reshaping and size distribution narrowing of the particles that result from the method of the invention.

Example 4

Powder 7 was produced from the following mixture by the mixing and extrusion procedure described in Example 2:

| | |
|---|---|
| Uralac ™ P5504 polyester resin (DSM Corp.) | 449 g |
| Azthane ™ I-100 polyisocyanate cross-linking agent (Sherex Polymers) | 119 g |
| Additol ™ XL486 flow control agent (Hoechst) | 30 g |
| Benzoin | 6.9 g |
| Polyfluo 523XF slip aid (Micro Powder) | 3 g |
| Dibutyltin dilaurate | 4.9 g |
| Titanium dioxide pigment | 378 g |
| Other pigments | 3.3 g |

A 3000-mL 4-necked flask was charged with 2000 mL of $H_2O$, 8.7 g of poly(methylaminoethanol adipate), 6.0 ml of Ludox™ TM and 1.0g of Triton™ X-100. 200 g of powder 7 was added to the solution, with stirring, and dispersed by stirring for 30 min (300 rpm, 25° C.). Following the dispersive stirring step, the mixture was heated to a temperature of 65°±5° C. and held for 1 hr. After cooling to room temperature, the solids were separated by filtration and allowed to air dry overnight. The air-dried powder was then transferred to a jacketed fluidizer and thoroughly dried by fluidizing at 45° C. with air for 2 hr to give powder 8.

Figure 7:
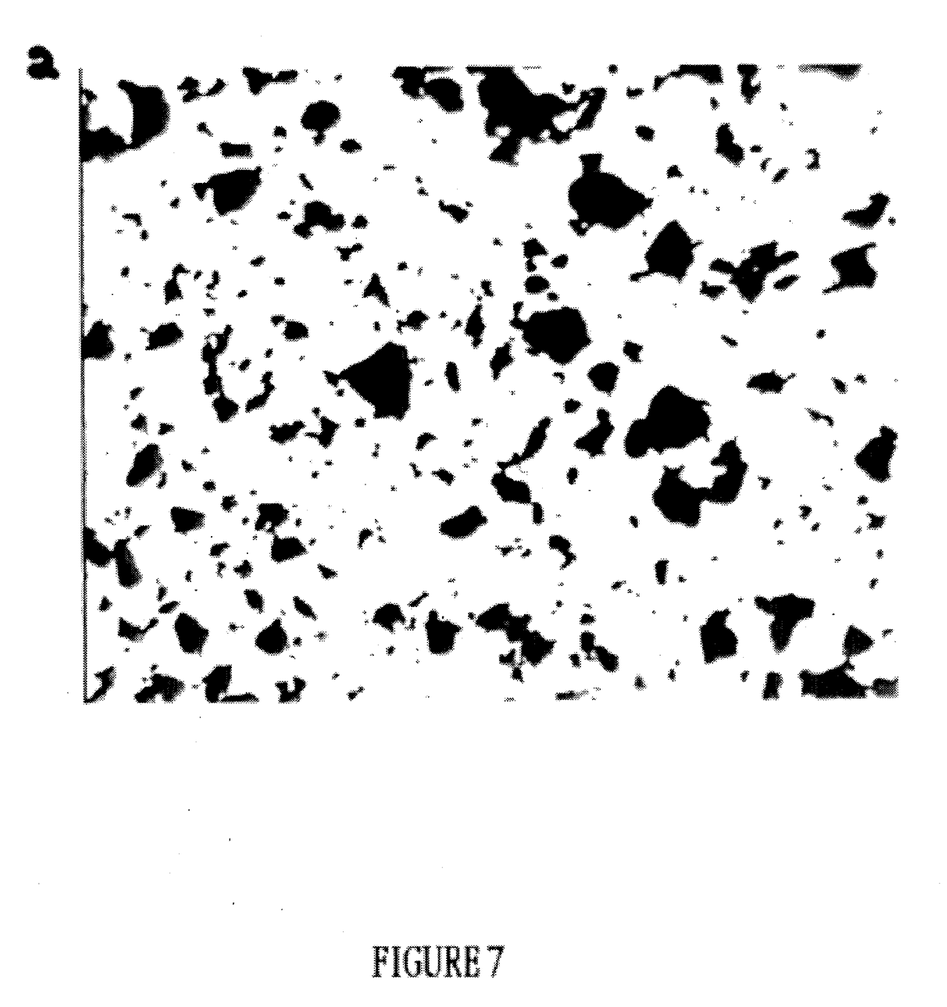
Figure 8:
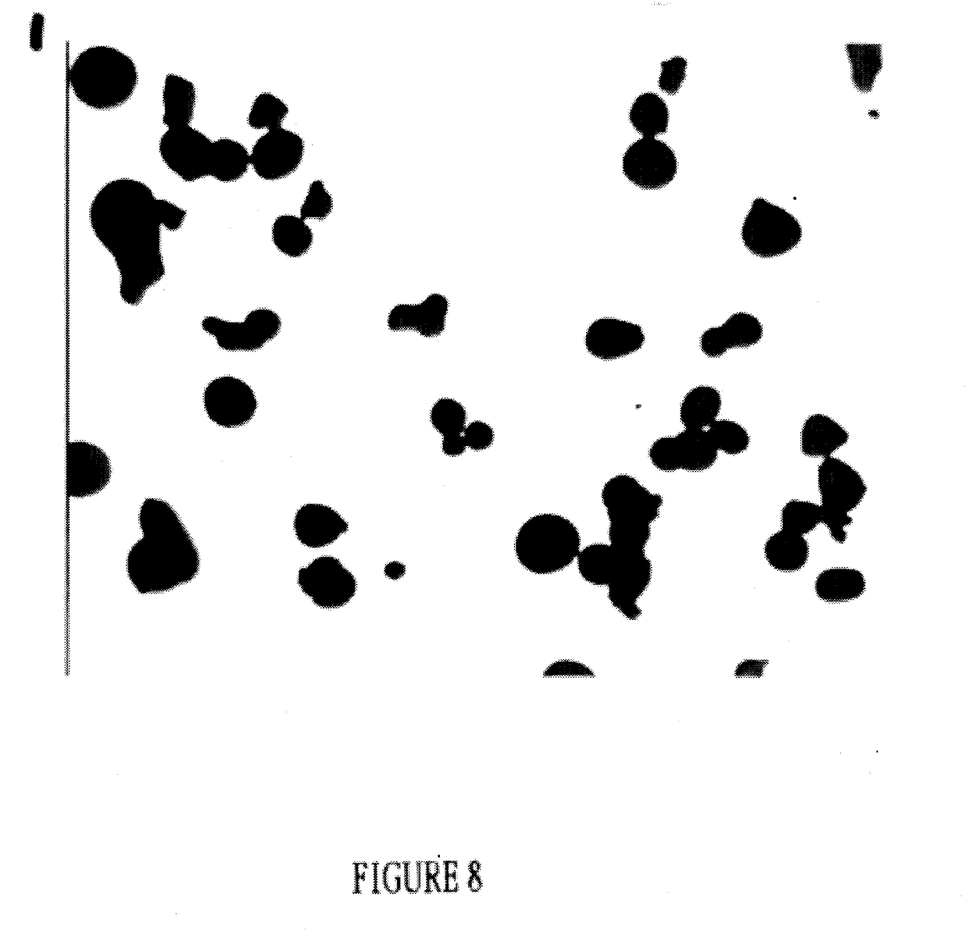

Comparison of the photomicrographs of powders 7 and 8 in FIG. 7 and 8, respectively show the particle rounding and size distribution narrowing produced by the method of the present invention.

Example 5

Comparison of Properties of Powder Coating Composition Particles

The properties of control powder coating compositions 1–7 and compositions 2–8, produced by the method of the invention as described in Examples 1–4, were measured, using a Microtrac particle size analyzer and a Sames Model AS 100 Fluidimeter by the procedures previously described. For the fluidization measurements, 250 g-samples of compositions 1 through 6 and 100 g-samples of compositions 7 and 8 were employed. Table 1 below contains the results of particle size and flow property measurements of the powders.

substantially smaller than the ratio for the particles of the corresponding control composition, demonstrating the narrowed particle size distribution in compositions 2–8 produced by the method of the invention.

With regard to mass flow rate (M), the values for compositions 2–8 were higher than those of the corresponding compositions 1–7, reflecting the increase in flow rate resulting from reshaping and rounding of the particles, in accordance with the present invention. Similar substantial improvements were observed in the Sames "Aptitude to Spraying" (R) values for compositions 2–8 vis-à-vis those obtained for compositions 1–7.

The invention has been described in detail with particular reference to preferred embodiments thereof, but it will be understood that variations and modifications can be effected within the spirit and scope of the invention.

We claim:

1. A method of preparing a powder coating composition that comprises:
   (a) forming a mixture comprising solid particles which include a curable resin and a cross-linking agent that is reactive with said curable resin suspended in an aqueous liquid phase comprising water, a surfactant, a stabilizer, and a promoter;
   (b) warming said mixture to a temperature sufficient to effect reshaping and rounding of said particles;
   (c) separating said particles from said aqueous liquid phase; and
   (d) drying said particles to form a powder.

2. A method according to claim 1 wherein said mixture further comprises a pigment or a dye.

3. A method according to claim 1 wherein said mixture further comprises a degassing agent.

4. A method according to claim 1 wherein said mixture further comprises a flow control agent.

5. A method according to claim 1 wherein said curable resin is a hydroxy-, epoxy-, amino-, or carboxy- substituted polyester or polyether, or a hydroxy-, epoxy-, amino-, or carboxy-substituted acrylic or methacrylic polymer.

6. A method according to claim 1 wherein said cross-linking agent is a polyisocyanate, a blocked polyisocyanate, a carboxylic anhydride, or an epoxy-substituted compound.

7. A method according to claim 1 wherein said curable resin is an epoxy-substituted polyester or polyether and said

TABLE 1

| Composition | S Mean Particle Size (μm) | D Particle Size Standard Deviation (μm) | D/S Relation Standard Deviation Ratio | B Bed Expansion Ratio | M Mass Flow Rate g/30 sec | R = B × M "Aptitude to Spraying" |
|---|---|---|---|---|---|---|
| 1 | 34.6 | 20.0 | 0.58 | 1.4 | 80.2 | 114 |
| 2 | 45.2 | 14.8 | 0.33 | 1.6 | 86.1 | 142 |
| 3 | 79.0 | 49.9 | 0.63 | 1.5 | 95.5 | 140 |
| 4 | 83.9 | 47.1 | 0.56 | 1.5 | 100.6 | 153 |
| 5 | 30.3 | 15.7 | 0.52 | 1.4 | 84.2 | 116 |
| 6 | 51.8 | 18.7 | 0.36 | 1.4 | 113.8 | 158 |
| 7 | 33.4 | 22.5 | 0.67 | 1.63 | 41.4 | 68 |
| 8 | 48.0 | 19.0 | 0.40 | 1.55 | 47.4 | 73 |

As shown by the mean particle size data in Table 1, warming the suspension to reshape and round the particles caused an increase in mean particle size (S) and, in most cases, a decrease in particle size standard deviation (D). However, in every case the relative standard deviation ratio (D/S) for the reshaped particles of a composition was cross-linking agent is a carboxylic anhydride.

8. A method according to claim 1 wherein said curable resin is an epoxy-substituted acrylic or methacrylic polymer and said cross-linking agent is a carboxylic anhydride.

9. A method according to claim 1 wherein said curable resin is a hydroxy-substituted polyester or polyether and said cross-linking agent is a polyisocyanate or a blocked polyisocyanate.

10. A method according to claim 1 wherein said curable resin is a hydroxy-substituted acrylic or methacrylic polymer and said cross-linking agent is a polyisocyanate or a blocked polyisocyanate.

11. A method according to claim 1 wherein said curable resin is a carboxy-substituted polyester or polyether and said cross-linking agent is an epoxy-substituted compound.

12. A method according to claim 1 wherein said curable resin is a carboxy-substituted acrylic or methacrylic polymer and said cross-linking agent is an epoxy-substituted compound.

13. A method according to claim 1 wherein said particles are about 1 to 50 weight percent of said aqueous liquid phase.

14. A method according to claim 13 wherein said particles are about 5 to 25 weight percent of said aqueous liquid phase.

15. A method according to claim 1 wherein said particles after said drying have a mean particle size of about 20 μm to 200 μm.

16. A method according to claim 15 wherein said particles have a mean particle size of about 40 μm to 100 μm.

17. A method according to claim 1 wherein said surfactant is a nonionic compound.

18. A method according to claim 1 wherein said stabilizer is silica, alumina, or titanium dioxide.

19. A method according to claim 18 wherein said stabilizer is colloidal silica.

20. A method according to claim 1 wherein said promoter is poly(diethanolamine adipate) or poly-(methylaminoethanol adipate).

21. A method according to claim 1 wherein said warming of said mixture is carried out at a temperature from about 40° C. above to about 40° C. below the glass transition temperature of said curable resin.

22. A method according to claim 21 wherein said warming is carried out at a temperature from about 10° C. above to about 10° C. below the glass transition temperature of said curable resin.

23. A method according to claim 21 wherein said warming is maintained from about 0.5 hour to 2 hours.

\* \* \* \* \*